(12) United States Patent
Lin et al.

(10) Patent No.: US 11,231,642 B2
(45) Date of Patent: Jan. 25, 2022

(54) LIGHT SOURCE MODULE, PROJECTOR USING THE SAME AND LIGHT SOURCE CONTROL METHOD

(71) Applicant: Qisda Corporation, Taoyuan (TW)

(72) Inventors: Chien-Hung Lin, Taoyuan (TW); Tzu-Huan Hsu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/065,588

(22) Filed: Oct. 8, 2020

(65) Prior Publication Data

US 2021/0109432 A1     Apr. 15, 2021

(30) Foreign Application Priority Data

Oct. 11, 2019    (CN) .......................... 201910962813.1

(51) Int. Cl.
    *G03B 21/20*        (2006.01)
    *H05B 47/105*      (2020.01)
    *G03B 21/16*        (2006.01)
    *G03B 33/12*        (2006.01)

(52) U.S. Cl.
CPC ......... *G03B 21/2053* (2013.01); *G03B 21/16* (2013.01); *G03B 21/2033* (2013.01); *H05B 47/105* (2020.01); *G03B 33/12* (2013.01)

(58) Field of Classification Search
CPC . G03B 21/2053; G03B 21/16; G03B 21/2033
USPC .......................................................... 353/85
See application file for complete search history.

(56) References Cited

U.S. PATENT DOCUMENTS

2004/0240495 A1* 12/2004 Akamatsu .............. G03B 21/16
                                                  372/32
2008/0165815 A1* 7/2008 Kamijima ............ H04N 9/3129
                                                  372/34

* cited by examiner

*Primary Examiner* — Jerry L Brooks

(57) ABSTRACT

A light source module, a projector using the same and a light source control method are disclosed. The light source module includes a laser light source, a temperature sensor, a light source driver and a controller. The temperature sensor is adjacent to the light source and configured to sense a light source temperature of the laser light source. The controller is configured to: (1) determine whether the light source temperature reaches a first temperature value; (2) if yes, control the light source driver to drive the laser light source to illuminate by a first current; (3) determine whether the light source temperature changes from the first temperature value to a second temperature value different from the first temperature value; and, (4) if yes, control the light source driver to drive the laser light source to illuminate by a second current different from the first current.

11 Claims, 4 Drawing Sheets

LIGHT SOURCE MODULE, PROJECTOR USING THE SAME AND LIGHT SOURCE CONTROL METHOD

This application claims the benefit of People's Republic of China application Serial No. 201910962813.1, filed on Oct. 11, 2019, the subject matter of which is incorporated herein by reference.

BACKGROUND OF THE INVENTION

Field of the Invention

The invention relates in general to a light source module, a projector using the same and a light source control method, and more particularly to a light source module having a laser light source, a projector using the same, and a light source control method.

Description of the Related Art

Conventional light source has a maximum allowable drive current, and the light source will function normally and have a normal lifespan as long as the working drive current of the light source is not larger than the maximum allowable drive current. Generally speaking, the light source directly sets the working drive current to the maximum allowable drive current. During the operation, the drive current will continuously increase until the maximum allowable drive current is reached. However, such method cannot be used in all types of light sources. Therefore, it has become a prominent task for the industries to provide a new drive method that can be used in a wider range of light sources.

SUMMARY OF THE INVENTION

The invention is directed to a light source module, a projector using the same and a light source control method for resolving the above problems.

According to one embodiment of the present invention, a light source module is disclosed. The light source module includes a laser light source, a temperature sensor, a light source driver and a controller. The temperature sensor is disposed adjacent to the light source and is configured to sense a light source temperature of the laser light source. The controller is configured to: determine whether the light source temperature reaches a first temperature value; when the light source temperature reaches the first temperature value, control the light source driver to drive the laser light source to illuminate by a first current; determine whether the light source temperature changes from the first temperature value to a second temperature value different from the first temperature value; and, when the light source temperature changes from the first temperature value to the second temperature value, control the light source driver to drive the laser light source to illuminate by a second current different from the first current.

According to another embodiment of the present invention, a projector is disclosed. The projector includes a projection module and a light source module. The light source module is configured to emit a light to the projection module. The light source module includes a laser light source, a temperature sensor, a light source driver and a controller. The temperature sensor is disposed adjacent to the light source and is configured to sense a light source temperature of the laser light source. The controller is configured to: determine whether the light source temperature reaches a first temperature value; when the light source temperature reaches the first temperature value, control the light source driver to drive the laser light source to illuminate by a first current; determine whether the light source temperature changes from the first temperature value to a second temperature value different from the first temperature value; and, when the light source temperature changes from the first temperature value to the second temperature value, control the light source driver to drive the laser light source to illuminate by a second current different from the first current.

According to an alternate embodiment of the present invention, a light source control method is disclosed. The light source control method includes the following steps: A light source temperature of a laser light source is detected. Whether the light source temperature reaches a first temperature value is determined. When the light source temperature reaches the first temperature value, a light source driver is controlled to drive the laser light source to illuminate by a first current. Whether the light source temperature changes from the first temperature value to a second temperature value different from the first temperature value is determined. When the light source temperature changes from the first temperature value to the second temperature value, the light source driver is controlled to drive the laser light source to illuminate by a second current different from the first current.

The above and other aspects of the invention will become better understood with regard to the following detailed description of the preferred but non-limiting embodiment (s) The following description is made with reference to the accompanying drawings.

DETAILED DESCRIPTION OF THE INVENTION

A number of embodiments and accompanying drawings are disclosed below for describing, not for limiting the invention.

Figure 1:
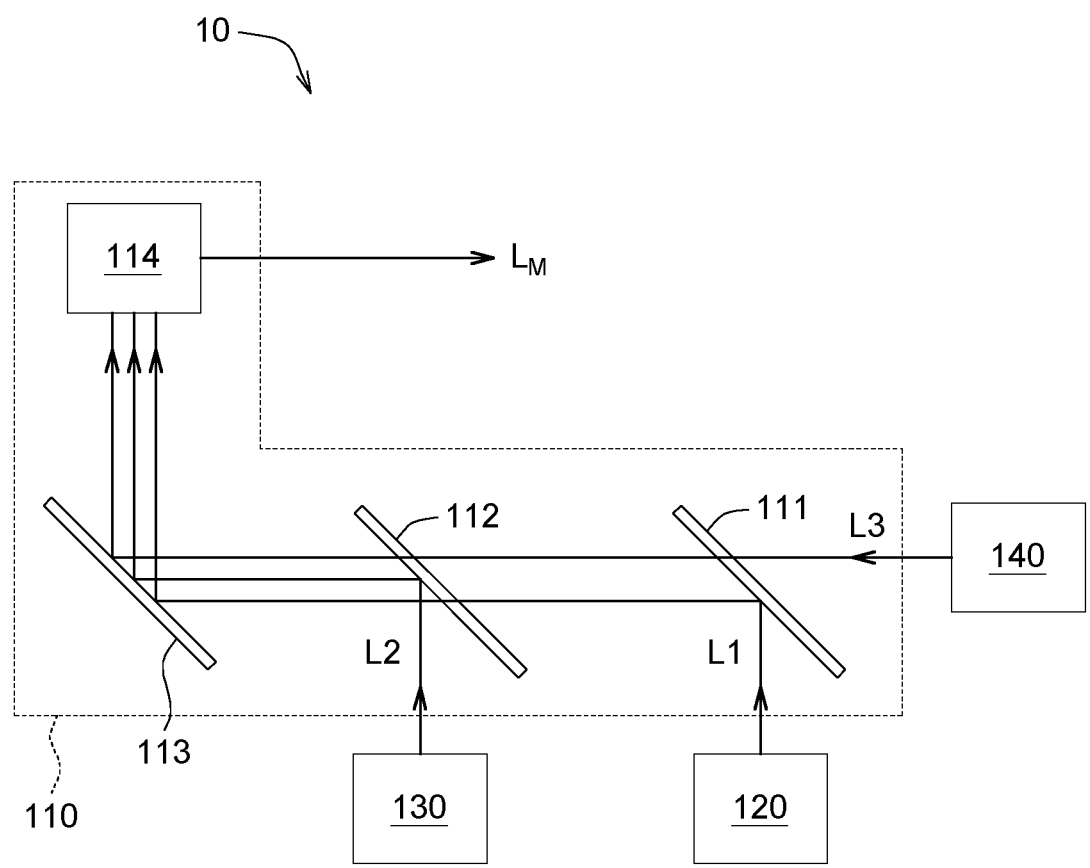
FIG. 1 illustrates a functional block diagram of a projector according to an embodiment of the invention.
Figure 2:
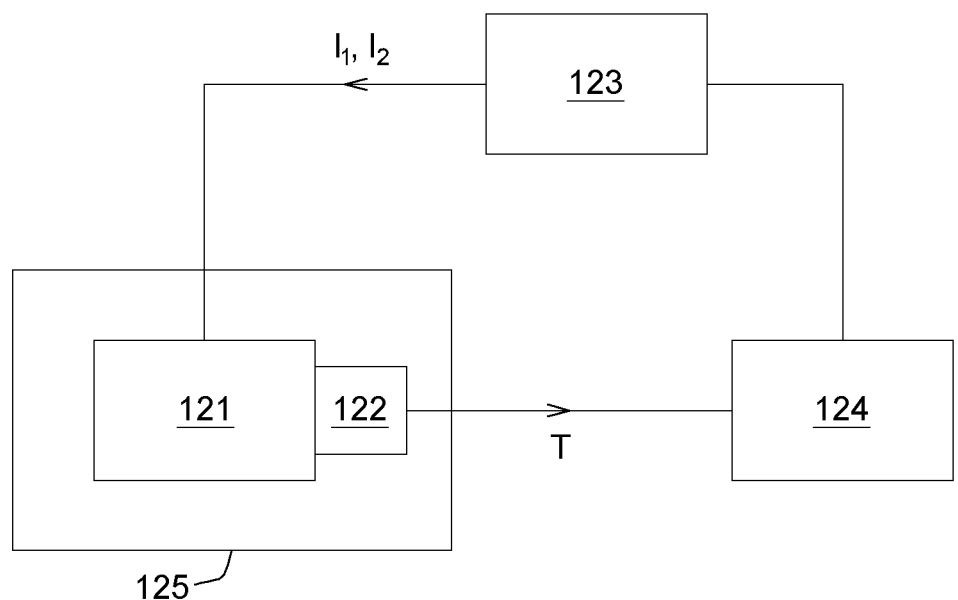
FIG. 2 illustrates a functional block diagram of the light source module of FIG. 1.

Refer to FIG. 1 and FIG. 2. FIG. 1 illustrates a functional block diagram of a projector 10 according to an embodiment of the invention. FIG. 2 illustrates a functional block diagram of the light source module 110 of FIG. 1. The projector 10 includes a projection module 110 and at least a light source module, such as light source modules 120, 130 and 140. The light source modules 120, 130 and 140 are configured to emit a first color light L1, a second color light L2 and a third color light L3 to the projection module 110. Then, the projection module 110 projects the first color light L1, the second color light L2 and the third color light L3 on a screen (not illustrated) outside the projector 10.

The projection module 110 includes at least a beam splitter (such as a first beam splitter 111 and a second beam splitter 112), a reflector 113, and a light valve 114. The first beam splitter 111, such as a bi-directional beam splitter, allows the third color light L3 to pass through but reflects the first color light L1. The second beam splitter 112, such as a bi-directional beam splitter, allows the first color light L1 and the third color light L3 to pass through but reflects the second color light L2. The reflector 113 reflects the first color light L1, the second color light L2 and the third color light L3 to the light valve 114. The light valve 114 can be formed of such as a digital micro-mirror device (DMD), a liquid-crystal-on-silicon panel (LCOS panel) or a penetrative liquid crystal panel. The light valve 114 can selectively allow at least one of the first color light L1, the second color light L2 and the third color light L3 to pass through, such that the illumination light (the first color light L1, the second color light L2 and the third color light L3) can be converted into an image light $L_M$, which is projected on a screen and forms an image screen.

As indicated in FIG. 2, the light source module 120 includes a laser light source 121, a temperature sensor 122, a light source driver 123, a controller 124 and a circuit board 125.

The laser light source 121 and the temperature sensor 122 are disposed on the circuit board 125. The laser light source 121, such as a monochromatic laser light source, emits a first color light L1 having a wavelength in a range of 620 nm to 750 nm, that is, a red light wavelength range, but the invention is not limited thereto. Besides, the laser light sources 122 and 123 both can be realized by such as a monochromatic laser light source. For example, the laser light source 122 is a green light laser light source, and the second color light L2 emitted thereby is a green light. The laser light source 123 is a blue light laser light source, and the third color light L3 emitted thereby is a blue light.

The temperature sensor 122 is disposed adjacent to the laser light source 121 and is configured to sense a light source temperature value T of the laser light source 121. As indicated in FIG. 2, the temperature sensor 122 contacts the laser light source 121, and the light source temperature value T sensed by the temperature sensor 122 is most close to the real working temperature of the laser light source 121. In another embodiment, as long as the difference between the light source temperature value T sensed by the temperature sensor 122 and the real working temperature of the laser light source 121 does not affect the light source control method of the invention, the temperature sensor 122 can be adjacent to the laser light source 121 but cannot contact the laser light source 121.

The light source driver 123 is electrically connected to the laser light source 121 to drive the laser light source 121 to illuminate. The controller 124 is electrically connected to the light source driver 123 to control the light source driver 123 to drive the laser light source 121 to illuminate.

In an embodiment, the controller 124 is configured to: (1) determine whether the light source temperature value T reaches the first temperature value T1; (2) when the light source temperature value T reaches the first temperature value T1, control the light source driver 123 to drive the laser light source to illuminate by a first current (the drive current) $I_1$; (3) determine whether the light source temperature value T changes from the first temperature value T1 to the second temperature value T2 different from the first temperature value T1; and, (4) when the light source temperature value T changes from the first temperature value T1 to the second temperature value T2, control the light source driver 123 to drive the laser light source 121 to illuminate by a second current (the drive current) $I_2$ different from the first current $I_1$. In other words, the light source control method of the invention can stagewise control the drive current according to the light source temperature to meet the drive characteristics of various types of laser light sources.

The light source control method of the invention can be used in the laser light sources of various characteristics. The characteristics of the laser light source 121 are exemplified below. The laser light source of the light source module 130 and/or the laser light source of the light source module 140 can have similar or completely different characteristics, and the invention does not have specific restrictions in this regard.

Figure 3:
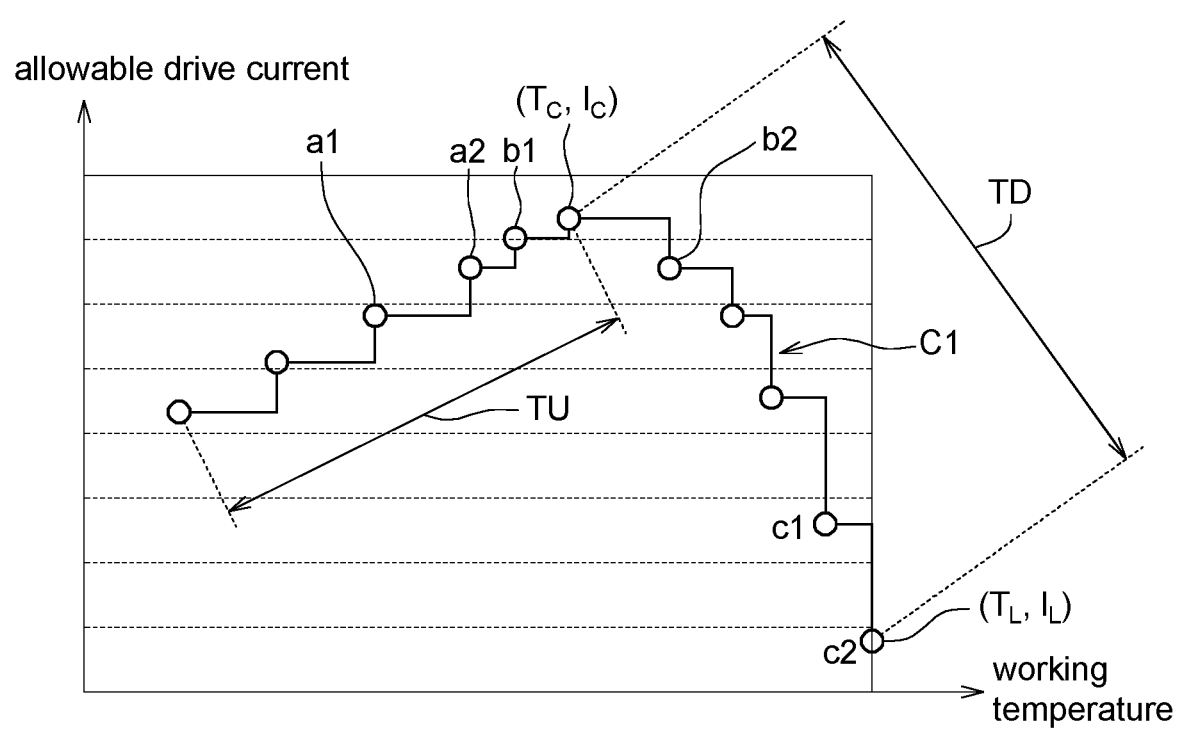
FIG. 3 illustrates a characteristic curve chart of drive current vs working temperature for the laser light source of the light source module of FIG. 1.

Referring to FIG. 3, a characteristic curve chart of drive current vs working temperature for the laser light source 121 of the light source module 120 of FIG. 1 is shown. The characteristic curve C1 of the laser light source 121 is determined according to the variety, power characteristics, function and/or manufacturing process of the light source, and is not subjected to the exemplification in FIG. 3. Moreover, the characteristic curve C1 can be converted into a table or formula stored in the controller 124. As indicated in FIG. 3, the laser light source 121 has a maximum allowable drive current for different temperature ranges. When the laser light source 121 is driven to illuminate by a current larger than the maximum allowable drive current, the laser light source 121 may be burnt or fail, and its lifespan thereof may even be reduced. As indicated in FIG. 3, the characteristics of the laser light source 121 include a threshold temperature value $T_C$ and a limit temperature value $T_L$. In the proportional section TU of the characteristic curve C1 (lower than the threshold temperature value $T_C$), the maximum allowable drive current is proportional to the working temperature. In the inversely proportional section TD of the characteristic curve C1 (higher than the threshold temperature value $T_C$), the maximum allowable drive current is inversely proportional to the working temperature. The working temperature corresponding to the intersection between the proportional section TU and the inversely proportional section TD is the threshold temperature value $T_C$. The limit temperature value $T_L$ represents the maximum allowable working temperature of the laser light source 121, and when the working temperature of the laser light source 121 is equivalent to or higher than the limit temperature value $T_L$, the laser light source 121 may be immediately burnt or fail.

As indicated in FIG. 3, the laser light source 121 has distinct stage characteristics, wherein the segment between every two adjacent circles represents a stage characteristic. The illumination characteristics of the laser light source 121 is sensitive to temperature change. Let points a1 and a2 be taken for example. When the laser light source 121 is driven to illuminate by the drive current at point a1 when the working temperature of the laser light source 121 has not yet reached point a1, the illumination quality of the laser light source 121, which may be abnormal or failed, cannot meet the requirements. The light source control method of the invention can apply stagewise control over the drive current in response to the working temperature of the laser light source 121.

Figure 4:
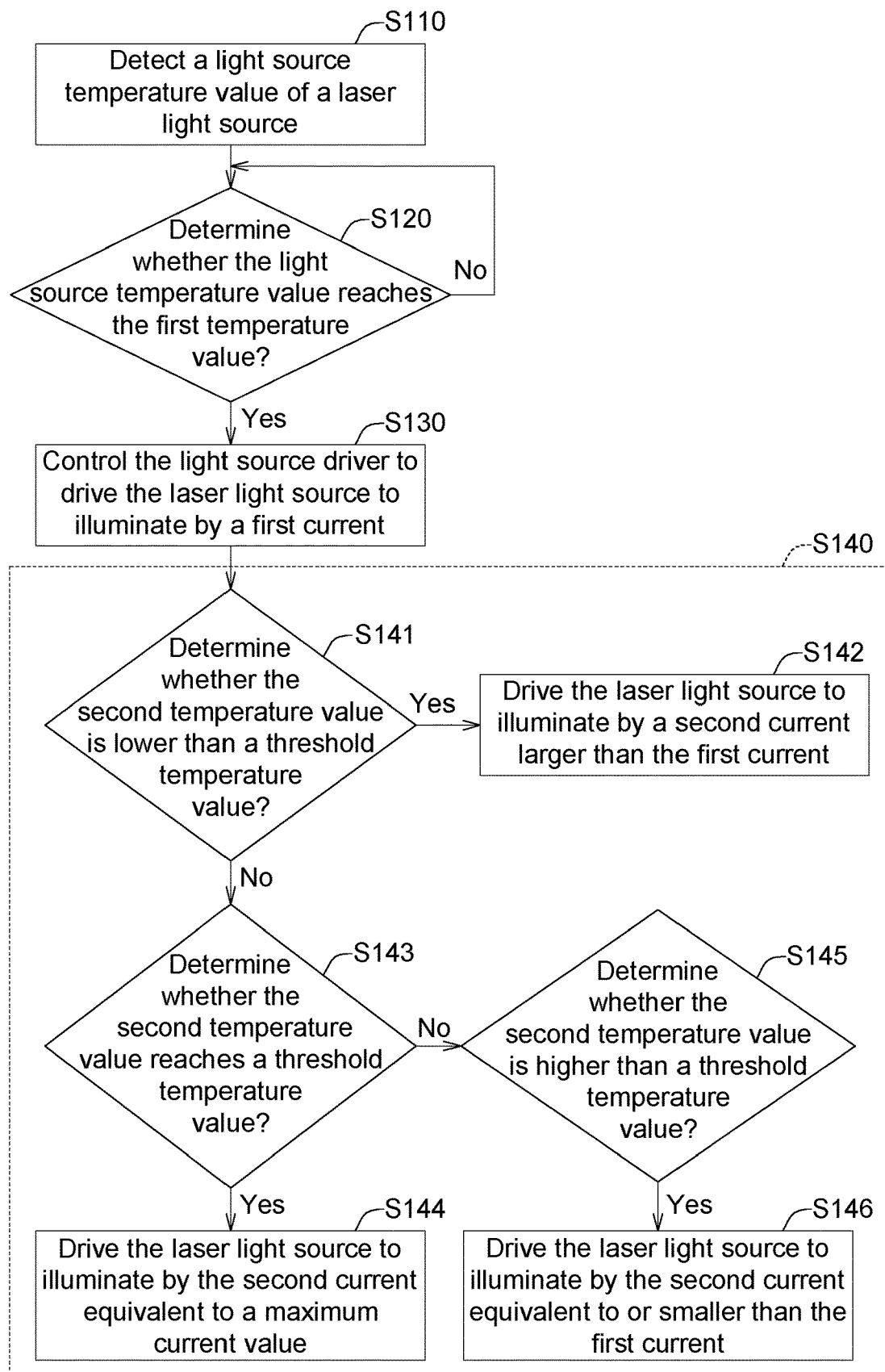
FIG. 4 illustrates a flowchart of a light source control method for the light source module of FIG. 2.

Referring to FIG. 4, a flowchart of a light source control method for the light source module 120 of FIG. 2 is shown.

In step S110, a light source temperature value T of a laser light source 121 is detected by a temperature sensor 122, wherein the light source temperature value T is transmitted to a controller 124. In each step of FIG. 4, the light source temperature value T of the laser light source 121 is continuously detected by the temperature sensor 122.

In step S120, whether the light source temperature value T reaches the first temperature value T1 is determined by the controller 124. When the light source temperature value T reaches the first temperature value T1, then the method proceeds to step S130. If no, the method returns to step S120, the change of the light source temperature value T is continuously monitored by the controller 124.

In step S130, when the light source temperature value T reaches the first temperature value T1, then the light source driver 123 is controlled by the controller 124 to drive the laser light source 121 to illuminate by a first current $I_1$.

In step S140, along with the passing of the time or the continuous operation or the laser light source 121, whether the light source temperature value T changes from the first temperature value T1 to the second temperature value T2 different from the first temperature value T1 is determined by the controller 124. When the light source temperature value T changes from the first temperature value T1 to the second temperature value T2, then the light source driver 123 is controlled by the controller 124 to drive the laser light source 121 to illuminate by the second current $I_2$ different from the first current $I_1$. Thus, the light source control method of the invention can stagewise control the drive current according to the light source temperature to meet the drive characteristics of the laser light source. In an embodiment, before the light source temperature value T reaches the second temperature value T2, the controller 124 controls the light source driver 123 to drive the laser light source 121 to illuminate by the first current $I_1$, a drive current smaller than the second current $I_2$ (such as between the first current $I_1$ and the second current $I_2$), or a drive current increasing continuously but not larger than the second current $I_2$.

In step S141, whether the second temperature value T2 is lower than the threshold temperature value $T_C$ is determined by the controller 124. When the second temperature value T2 is lower than the threshold temperature value $T_C$, then the method proceeds to step S142. If no, then the method proceeds to step S143. Besides, the first temperature value T1 is lower than the limit temperature value $T_L$.

As indicated in the proportional section TU of FIG. 3, the drive current increases as the working temperature increases. In step S142, when the second temperature value T2 is lower than the threshold temperature value $T_C$, then the light source driver 123 is controlled by the controller 124 to drive the laser light source 121 to illuminate by the second current $I_2$ larger than the first current $I_1$. Let the first temperature value T1 correspond to point b1 and the second temperature value T2 correspond to point b2. Since the second temperature value T2 corresponding to point a2 is higher than the first temperature value T1 corresponding to point a1, the second current $I_2$ is larger than the second current $I_1$.

In step S143, whether the second temperature value T2 reaches the threshold temperature value $T_C$ is determined by the controller 124. When the second temperature value T2 reaches the threshold temperature value $T_C$, then the method proceeds to step S144. If no, then the method proceeds to step S145. Besides, the second temperature value T2 is lower than the limit temperature value $T_L$.

In step S144, since the second temperature value T2 already reaches the threshold temperature value $T_C$, the light source driver 123 is controlled by the controller 124 to drive the laser light source 121 to illuminate by the second current $I_2$ substantially equivalent to the maximum current value $I_C$ according to the characteristics curve of FIG. 3, wherein the maximum current value $I_C$ is the drive current corresponding to the threshold temperature value $T_C$.

In step S145, whether the second temperature value T2 is higher than the threshold temperature value $T_C$ is determined by the controller 124. When the second temperature value T2 is higher than the threshold temperature value $T_C$, then the method proceeds to step S146.

As indicated in the inversely proportional section TD of FIG. 3, the drive current decreases as the working temperature increases. In step S146, when the second temperature value T2 is higher than the threshold temperature value $T_C$, then the light source driver 123 is controlled by the controller 124 to drive the laser light source 121 to illuminate by the second current $I_2$ equivalent to or smaller than the first current $I_1$. Let the first temperature value T1 correspond to point b1 and the second temperature value T2 correspond to point b2. Since the second temperature value T2 is higher than the threshold temperature value $T_C$, the second current $I_2$ is smaller than or substantially equivalent to the first current $I_1$ (the point b1 and point b2 on the same level of the horizontal axis correspond to the same allowable drive current).

In step S146, when the second temperature value T2 reaches the limit temperature value $T_L$, then the light source driver 123 is controlled by the controller 124 to drive the laser light source 121 to illuminate by the second current I2 equivalent to or smaller than (that is, not larger than) the limit current $I_L$ to avoid the laser light source 121 being burnt or failed. Let the first temperature value T1 correspond to point c1 and the second temperature value T2 correspond to point c2. Since the second temperature value T2 reaches or is close to the threshold temperature value $T_C$, the second current $I_2$ is substantially equivalent to or lower than (that is, not larger than) the limit temperature value $T_L$ to avoid the laser light source 121 being burnt or failed.

In addition, in an embodiment, the limit current $I_L$ is smaller than either of the second current $I_2$ and the first current $I_1$. For example, the limit current $I_L$ is the smallest of the allowable drive currents.

Then, the above steps are repeated, the working temperature of the laser light source 121 is continuously monitored, and the drive current is controlled stagewise. Although the control method is exemplified by an increasing stage of the working temperature (such as the stage in which the second temperature value T2 is higher than the first temperature value T1) in the above embodiments, the control method for the decreasing stage of the working temperature (such as the stage in which the second temperature value T2 is lower than the first temperature value T1) is the same. That is, the drive current is stagewise controlled according to the drive current corresponding to the decreased working temperature.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A light source module, comprising:
a laser light source;
a temperature sensor disposed adjacent to the light source and configured to sense a light source temperature of the laser light source;
a light source driver; and
a controller configured to:
determine whether the light source temperature reaches a first temperature value;

control the light source driver to drive the laser light source to illuminate by a first current when the light source temperature reaches the first temperature value;
determine whether the light source temperature changes from the first temperature value to a second temperature value different from the first temperature value; and
control the light source driver to drive the laser light source to illuminate by a second current different from the first current when the light source temperature changes from the first temperature value to the second temperature value;
wherein the second temperature value is higher than the first temperature value, and step of determining whether the light source temperature changes from the first temperature value to the second temperature value further comprises:
determining whether the second temperature value is lower than a threshold temperature value; and
driving the laser light source to illuminate by a second current larger than the first current when the second temperature value is lower than a threshold temperature value;
wherein the laser light source has a characteristic curve comprising a plurality of segments, and the adjacent two segments are controlled by the first current and the second current which are constant when the second temperature value is lower than the threshold temperature value.

2. The light source module according to claim 1, wherein, the second temperature value is higher than the first temperature value, and the step of determining whether the light source temperature changes from the first temperature value to the second temperature value further comprises:
determining whether the second temperature value reaches a threshold temperature value; and
driving the laser light source to illuminate by the second current equivalent to a maximum current value when the second temperature value reaches the threshold temperature value.

3. The light source module according to claim 1, wherein, the second temperature value is higher than the first temperature value, and step of determining whether the light source temperature changes from the first temperature value to the second temperature value further comprises:
determining whether the second temperature value is higher than a threshold temperature value; and
driving the laser light source to illuminate by the second current equivalent to or smaller than the first current when the second temperature value is higher than the threshold temperature value.

4. The light source module according to claim 1, wherein, the laser light source is a monochromatic laser light source, and the light emitted from the laser light source has a wavelength in a range of 620 nm to 750 nm.

5. A projector, comprising:
a projection module; and
a light source module configured to emit a light to the projection module, wherein the light source module comprises:
a laser light source;
a temperature sensor disposed adjacent to the light source and configured to sense a light source temperature of the laser light source;
a light source driver; and
a controller configured to:
determine whether the light source temperature reaches a first temperature value;
control the light source driver to drive the laser light source to illuminate by a first current when the light source temperature reaches the first temperature value,
determine whether the light source temperature changes from the first temperature value to a second temperature value different from the first temperature value; and
control the light source driver to drive the laser light source to illuminate by a second current different from the first current when the light source temperature changes from the first temperature value to the second temperature value;
wherein the second temperature value is higher than the first temperature value, and step of determining whether the light source temperature changes from the first temperature value to the second temperature value further comprises:
determine whether the second temperature value is lower than a threshold temperature value; and
driving the laser light source to illuminate by the second current larger than the first current when the second temperature value is lower than a threshold temperature value;
wherein the laser light source has a characteristic curve comprising a plurality of segments, and the adjacent two segments are controlled by the first current and the second current which are constant when the second temperature value is lower than the threshold temperature value.

6. The projector according to claim 5, wherein, the second temperature value is higher than the first temperature value, and step of determining whether the light source temperature changes from the first temperature value to the second temperature value further comprises:
determine whether the second temperature value reaches a threshold temperature value; and
driving the laser light source to illuminate by the second current equivalent to a maximum current value when the second temperature value reaches the threshold temperature value.

7. The projector according to claim 5, wherein, the second temperature value is higher than the first temperature value, and step of determining whether the light source temperature changes from the first temperature value to the second temperature value further comprises:
determining whether the second temperature value is higher than a threshold temperature value; and
driving the laser light source to illuminate by the second current equivalent to or smaller than the first current when the second temperature value is higher than the threshold temperature value.

8. The projector according to claim 5, wherein, the laser light source is a monochromatic laser light source, and the light emitted from the laser light source has a wavelength in a range of 620 nm to 750 nm.

9. A light source module, comprising:
a laser light source;
a temperature sensor disposed adjacent to the light source and configured to sense a light source temperature of the laser light source;
a light source driver; and
a controller configured to:
determine whether the light source temperature reaches a first temperature value;

control the light source driver to drive the laser light source to illuminate by a first current when the light source temperature reaches the first temperature value;

determine whether the light source temperature changes from the first temperature value to a second temperature value different from the first temperature value; and control the light source driver to drive the laser light source to illuminate by a second current different from the first current when the light source temperature changes from the first temperature value to the second temperature value;

wherein the second temperature value is higher than the first temperature value, and the step of determining whether the light source temperature changes from the first temperature value to the second temperature value further comprises:

determining whether the second temperature value reaches a threshold temperature value; and driving the laser light source to illuminate by the second current equivalent to a maximum current value when the second temperature value reaches the threshold temperature value.

10. The projector according to claim 3, wherein the laser light source has a characteristic curve comprising a plurality of segments, and the adjacent two segments are controlled by the first current and the second current which are constant when the second temperature value is higher than the threshold temperature value.

11. The projector according to claim 7, wherein the laser light source has a characteristic curve comprising a plurality of segments, and the adjacent two segments are controlled by the first current and the second current which are constant when the second temperature value is higher than the threshold temperature value.

* * * * *